(12) United States Patent
Zhou et al.

(10) Patent No.: US 10,735,986 B2
(45) Date of Patent: Aug. 4, 2020

(54) RADIO RESOURCE DETERMINING SYSTEMS AND METHODS

(71) Applicant: HUAWEI TECHNOLOGIES CO., LTD., Shenzhen, Guangdong (CN)

(72) Inventors: Runze Zhou, Shanghai (CN); Li Li, Shenzhen (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/971,042

(22) Filed: May 4, 2018

(65) Prior Publication Data
US 2018/0255475 A1    Sep. 6, 2018

Related U.S. Application Data

(63) Continuation of application No. PCT/CN2015/093949, filed on Nov. 6, 2015.

(51) Int. Cl.
*H04W 4/00* (2018.01)
*H04W 24/10* (2009.01)
(Continued)

(52) U.S. Cl.
CPC ........... *H04W 24/10* (2013.01); *H04W 16/02* (2013.01); *H04W 16/06* (2013.01); *H04W 76/12* (2018.02);
(Continued)

(58) Field of Classification Search
CPC ..... H04W 24/10; H04W 76/12; H04W 76/14; H04W 16/02; H04W 16/06; H04W 4/80
See application file for complete search history.

(56) References Cited

U.S. PATENT DOCUMENTS

2010/0240312 A1    9/2010 Peng et al.
2010/0304759 A1    12/2010 Leppanen et al.
(Continued)

FOREIGN PATENT DOCUMENTS

CN    103338497 A    10/2013
CN    104811892 A    7/2015
(Continued)

OTHER PUBLICATIONS

Japanese Notice of Allowance dated Mar. 5, 2019 in corresponding Japanese Patent Application No. 2018-521407 (1 page).
(Continued)

*Primary Examiner* — Abdelnabi O Musa
(74) *Attorney, Agent, or Firm* — Slater Matsil, LLP

(57) ABSTRACT

This application provides a radio resource determining method and apparatus. The method includes: selecting, by a terminal from candidate resources, a radio resource used for a proximity-based service; and sending report information to a first service server, where the report information is used to report that the terminal is to perform the proximity-based service by using the radio resource, and the first service server is a service server in a home network of the terminal. According to embodiments of the present invention, the terminal selects the radio resource used for performing the proximity-based service, so as to avoid a time loss caused by allocation of the radio resource to the terminal by a base station, thereby improving efficiency of performing the proximity-based service by the terminal.

21 Claims, 6 Drawing Sheets

(51) Int. Cl.
*H04W 16/02* (2009.01)
*H04W 76/14* (2018.01)
*H04W 76/12* (2018.01)
*H04W 16/06* (2009.01)
*H04W 76/10* (2018.01)
*H04W 72/02* (2009.01)
*H04W 4/80* (2018.01)

(52) U.S. Cl.
CPC .............. *H04W 76/14* (2018.02); *H04W 4/80* (2018.02); *H04W 72/02* (2013.01); *H04W 76/10* (2018.02)

(56) References Cited

U.S. PATENT DOCUMENTS

| | | | |
|---|---|---|---|
| 2013/0150061 | A1 | 6/2013 | Shin et al. |
| 2013/0288668 | A1* | 10/2013 | Pragada ............... H04W 12/06 455/426.1 |
| 2014/0056220 | A1* | 2/2014 | Poitau ................. H04W 76/14 370/328 |
| 2014/0130137 | A1 | 5/2014 | Baek et al. |
| 2014/0153509 | A1* | 6/2014 | Guo ..................... H04W 48/16 370/329 |
| 2014/0348081 | A1* | 11/2014 | Liao ....................... H04L 67/16 370/329 |
| 2016/0212784 | A1 | 7/2016 | Fujishiro et al. |
| 2016/0212785 | A1* | 7/2016 | Fujishiro ............ H04W 72/048 |
| 2016/0262012 | A1 | 9/2016 | Kimura et al. |
| 2016/0278150 | A1 | 9/2016 | Jung et al. |
| 2016/0330604 | A1* | 11/2016 | Kim ..................... H04W 74/00 |
| 2016/0381543 | A1 | 12/2016 | Zhang et al. |
| 2017/0006582 | A1 | 1/2017 | Jung et al. |
| 2017/0006653 | A1 | 1/2017 | Zeng et al. |
| 2017/0171837 | A1 | 6/2017 | Chen et al. |
| 2018/0007622 | A1* | 1/2018 | Kim ..................... H04W 48/16 |
| 2018/0070264 | A1* | 3/2018 | Saiwai ............. H04W 28/0278 |
| 2018/0332644 | A1 | 11/2018 | Jeong |

FOREIGN PATENT DOCUMENTS

| | | |
|---|---|---|
| CN | 104936292 A | 9/2015 |
| JP | 2015154243 A | 8/2015 |
| JP | 2016530733 A | 9/2016 |
| JP | 2016535511 A | 11/2016 |
| RU | 2503153 C2 | 12/2013 |
| RU | 2515547 C2 | 5/2014 |
| WO | 2015016646 A1 | 2/2015 |
| WO | 2015053382 A1 | 4/2015 |
| WO | 2015113311 A1 | 8/2015 |
| WO | 2015115847 A1 | 8/2015 |
| WO | 2015/142994 A1 | 9/2015 |

OTHER PUBLICATIONS

International Search Report dated Jul. 21, 2016 in corresponding International Patent Application No. PCT/CN2015/093949.
"3$^{rd}$ Generation Partnership Project; Technical Specification Group Services and System Aspects; Proximity-based services (ProSe); Stage 2 (Release 13)," 3GPP TS 23.303, V13.1.1, Sep. 2015, 116 pgs.
"3$^{rd}$ Generation Partnership Project; Technical Specification Group Core Network and Terminals; Proximity-services (ProSe) User Equipment (UE) to ProSe function protocol aspects; Stage 3 (Release 13)," 3GPP, TS 24.334, V13.1.0, 143 pgs.
"3$^{rd}$ Generation Partnership Project; Technical Specification Group Services and system Aspects; Telecommunication management; Charging management; Proximity-based Services (ProSe) charging (Release 12)," 3GPP TS 32.277, V12.3.0, Sep. 2015, 76 pgs.
"3$^{rd}$ Generation Partnership Project; Technical Specification Group Services and System Aspects; Telecommunication management; Charging management; Charging Data Record (CDR) parameter description (Release 13)," 3GPP TS 32.298, V13.1.0, Sep. 2015, 184 pgs.
"3$^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP Ts 36.331, V12.7.0, Sep. 2015, 453 pgs.
International Search Report dated Jul. 21, 2016, in corresponding International Patent Application No. PCT/CN2015/093949, 7 pgs.
Written Opinion of the International Search Authority dated Jul. 21, 2016, in corresponding International Patent Application No. PCT/CN2015/093949, 5 pgs.
Extended European Search Report, dated Sep. 5, 2018, in European Application No. 15907639.7 (7 pp.).
3GPP TSG-RAN WG2 #91Bis, R2-154899, Qualcomm Incorporated, "Running stage 2 CR TS 36.300 to capture agreement on eD2D" Malmo, Sweden, Oct. 5-9, 2015. 21 pages.
3GPP SA WG2 Meeting #111, S2-153657, Qualcomm Incorporated, "Procedure aspects of inter-PLMN discovery transmission support" Chengdu, China, Oct. 19-23, 2015. 17 pages.
3GPP SA WG2 Meeting #111, S2-153656, Qualcomm Incorporated, "Radio resources aspects of inter-PLMN discovery transmission support" Chengdu, China, Oct. 19-23, 2015. 4 pages.
Korean Office Action dated Apr. 9, 2019 in corresponding Korean Patent Application No. 10-2018-7014703 (10 pages).
Russian Office Action dated Feb. 26, 2019 in corresponding Russian Patent Application No. 2018120311/07 (10 pages).

* cited by examiner

RADIO RESOURCE DETERMINING SYSTEMS AND METHODS

CROSS-REFERENCE TO RELATED APPLICATIONS

This application is a continuation of International Patent Application No. PCT/CN2015/093949 filed on Nov. 6, 2015. The disclosure of the aforementioned application is hereby incorporated by reference in the entity.

TECHNICAL FIELD

The present disclosure relates to the communications field, and in particular, to a radio resource determining method and apparatus, and a service server.

BACKGROUND

With rapid development of wireless communications systems, forms of wireless communications services are becoming diversified, and spectrum resources are becoming scarce. Device to device (D2D for short) communication can effectively improve spectrum utilization of a system, and the D2D communication can be used in lots of scenarios. Therefore, in the 3rd Generation Partnership Project (3GPP for short), the D2D communication has been integrated into Long Term Evolution (LTE for short), and is referred to as a proximity-based service (ProSe for short).

In the prior art, before a terminal performs a proximity-based service each time, a base station accessed by the terminal needs to allocate, to the terminal, a radio resource used for the proximity-based service, and then the terminal performs the proximity-based service by using the radio resource allocated by the base station. A base station needs to allocate, to each terminal, a radio resource used for a proximity-based service, and each time of radio resource allocation requires a period of time. Therefore, when a relatively large quantity of terminals need to perform a proximity-based service, it may take a relatively long period of time to allocate radio resources to the terminals, affecting efficiency of performing a proximity-based service by a terminal.

SUMMARY

Embodiments of the present invention provide a radio resource determining method and apparatus, and a service server, so as to improve efficiency of performing a proximity-based service by a terminal.

According to a first aspect, an embodiment of the present invention provides a radio resource determining method, including: selecting, by a terminal, a radio resource used for a proximity-based service from a candidate resource; and sending, by the terminal, report information to a first service server, where the report information is used for reporting that the terminal is to perform the proximity-based service by using the radio resource, and is used by a service server of a network to which the radio resource belongs to manage the proximity-based service of the terminal, and the first service server is a service server in a home network of the terminal.

With reference to the first aspect, in a first possible implementation of the first aspect, the selecting, by a terminal, a radio resource used for a proximity-based service from a candidate resource includes: receiving, by the terminal, authorization information sent by the first service server, where the authorization information is network information used for indicating that the terminal is allowed to perform the proximity-based service; and selecting, by the terminal, the radio resource from the candidate resource according to the authorization information.

With reference to the first possible implementation of the first aspect, in a second possible implementation of the first aspect, the selecting, by the terminal, the radio resource according to the authorization information includes: selecting, by the terminal, the candidate resource as the radio resource when network information corresponding to the candidate resource is the same as the network information carried in the authorization information.

With reference to any one of the first aspect, or the first and second possible implementations of the first aspect, in a third possible implementation of the first aspect, the report information carries a network identifier of the network to which the radio resource belongs.

With reference to any one of the first aspect, or the first to third possible implementations of the first aspect, in a fourth possible implementation of the first aspect, the method further includes: performing, by the terminal, the proximity-based service by using the radio resource.

With reference to any one of the first aspect, or the first to third possible implementations of the first aspect, in a fifth possible implementation of the first aspect, the method further includes: receiving, by the terminal, a response message sent by the first service server, where the response message is used for indicating whether the terminal can perform the proximity-based service by using the radio resource.

With reference to the fifth possible implementation of the first aspect, in a sixth possible implementation of the first aspect, the method further includes: when it is determined, according to the response message, that the proximity-based service can be performed by using the radio resource, performing, by the terminal, the proximity-based service by using the radio resource.

According to a second aspect, an embodiment of the present invention provides another radio resource determining method, including: receiving, by a first service server, report information sent by a terminal, where the report information is used for reporting that the terminal is to perform a proximity-based service by using a radio resource, and the radio resource is selected by the terminal from a candidate resource; and learning, by the first service server according to the report information, of the radio resource used by the terminal to perform the proximity-based service.

With reference to the second aspect, in a first possible implementation of the second aspect, the method further includes: detecting, by the first service server, whether the terminal can perform the proximity-based service by using the radio resource; and sending, by the first service server, a response message to the terminal, where the response message is used for indicating whether the terminal can perform the proximity-based service by using the radio resource.

With reference to the first possible implementation of the second aspect, in a second possible implementation of the second aspect, the detecting, by the first service server, whether the terminal can perform the proximity-based service by using the radio resource includes: when the report information includes a network identifier, detecting, by the first service server, whether the terminal can perform the proximity-based service by using a radio resource of a network corresponding to the network identifier.

With reference to the second possible implementation of the second aspect, in a third possible implementation of the second aspect, the method further includes: when the radio resource does not belong to a network to which the first network device belongs, sending, by the first service server, notification information to a second service server, where the notification information is used for reporting that the terminal is to perform the proximity-based service by using the radio resource, and the second service server belongs to the network corresponding to the network identifier.

According to a third aspect, an embodiment of the present invention provides a radio resource determining apparatus, including: a selection unit, configured to select a radio resource used for a proximity-based service from a candidate resource; and a report unit, configured to send report information to a first service server, where the report information is used for reporting that the terminal is to perform the proximity-based service by using the radio resource, and is used by a service server of a network to which the radio resource belongs to manage the proximity-based service of the terminal, and the first service server is a service server in a home network of the terminal.

With reference to the third aspect, in a first possible implementation of the third aspect, the selection unit includes: a receiving subunit, configured to receive authorization information sent by the first service server, where the authorization information is network information used for indicating that the terminal is allowed to perform the proximity-based service; and a selection subunit, configured to select the radio resource from the candidate resource according to the authorization information.

With reference to the first possible implementation of the third aspect, in a second possible implementation of the third aspect, the selection subunit is specifically configured to select the candidate resource as the radio resource when network information corresponding to the candidate resource is the same as the network information carried in the authorization information.

With reference to any one of the third aspect, or the first and second possible implementations of the third aspect, in a third possible implementation of the third aspect, the report information carries a network identifier of the network to which the radio resource belongs.

With reference to any one of the third aspect, or the first to third possible implementations of the third aspect, in a fourth possible implementation of the third aspect, the apparatus further includes: an execution unit, configured to perform the proximity-based service by using the radio resource.

With reference to any one of the third aspect, or the first to third possible implementations of the third aspect, in a fifth possible implementation of the third aspect, the apparatus further includes: a receiving unit, configured to receive a response message sent by the first service server, where the response message is used for indicating whether the terminal can perform the proximity-based service by using the radio resource.

With reference to the fifth possible implementation of the third aspect, in a sixth possible implementation of the third aspect, the apparatus further includes an execution unit, where the execution unit is configured to: when it is determined, according to the response message, that the proximity-based service can be performed by using the radio resource, perform the proximity-based service by using the radio resource.

According to a fourth aspect, an embodiment of the present invention provides another radio resource determining apparatus, including: a receiving unit, configured to receive report information sent by a terminal, where the report information is used for reporting that the terminal is to perform a proximity-based service by using a radio resource, and the radio resource is selected by the terminal from a candidate resource; and a learning unit, configured to learn, according to the report information, of the radio resource used by the terminal to perform the proximity-based service.

With reference to the fourth aspect, in a first possible implementation of the fourth aspect, the apparatus further includes: a detection unit, configured to detect whether the terminal can perform the proximity-based service by using the radio resource; and a sending unit, configured to send a response message to the terminal, where the response message is used for indicating whether the terminal can perform the proximity-based service by using the radio resource.

With reference to the first possible implementation of the fourth aspect, in a second possible implementation of the fourth aspect, the detection unit is specifically configured to: when the report information includes a network identifier, detect whether the terminal can perform the proximity-based service by using a radio resource of a network corresponding to the network identifier.

With reference to the second possible implementation of the fourth aspect, in a third possible implementation of the fourth aspect, the sending unit is further configured to: when the radio resource does not belong to a network to which the first network device belongs, send notification information to a second service server, where the notification information is used for reporting that the terminal is to perform the proximity-based service by using the radio resource, and the second service server belongs to the network corresponding to the network identifier.

According to a fifth aspect, an embodiment of the present invention further provides a terminal, including a processor and a communications module, where the processor is configured to select a radio resource used for a proximity-based service from a candidate resource; and the communications module is configured to send report information to a first service server, where the report information is used for reporting that the terminal is to perform the proximity-based service by using the radio resource, and is used by a service server of a network to which the radio resource belongs to manage the proximity-based service of the terminal, and the first service server is a service server in a home network of the terminal.

According to a sixth aspect, an embodiment of the present invention further provides a service server, including a processor and a communications module, where the communications module is configured to receive report information sent by a terminal, where the report information is used for reporting that the terminal is to perform a proximity-based service by using a radio resource, and the radio resource is selected by the terminal from a candidate resource; and the processor is configured to learn, according to the report information, of the radio resource used by the terminal to perform the proximity-based service.

According to a seventh aspect, an embodiment of the present invention further provides another radio resource determining method, including: invoking, by a second base station, a radio resource for a first base station, where the radio resource is used by a terminal served by the first base station, to perform a proximity-based service, the radio resource and the second base station belong to a second network, the first base station belongs to a first network, and the second network is different from the first network; and sending, by the second base station, second notification information to the second service server, where the second notification information is used for reporting that the second base station has invoked the radio resource for the first base station, and the second service server belongs to the second network.

With reference to the seventh aspect, in a first possible implementation of the seventh aspect, the invoking, by a second base station, a radio resource for a first base station includes: invoking, by the second base station for the first base station, a candidate resource available for the proximity-based service, where the candidate resource includes the radio resource.

With reference to the seventh aspect or the first possible implementation of the seventh aspect, in a second possible implementation of the seventh aspect, the second notification information carries a network identifier of the first network.

With reference to any one of the seventh aspect, or the first and second possible implementations of the seventh aspect, in a third possible implementation of the seventh aspect, the second notification information carries invocation information of the radio resource.

With reference to the third possible implementation of the seventh aspect, in a fourth possible implementation of the seventh aspect, the invocation information includes at least one type of the following information: a frequency of the radio resource, bandwidth of the radio resource, or invocation duration of the radio resource.

According to an eighth aspect, an embodiment of the present invention further provides another radio resource determining method, including: receiving, by a second service server, second notification information sent by a second base station, where the second notification information is used for reporting that the second base station invokes a radio resource for a first base station, so that a terminal that accesses the first base station performs a proximity-based service by using the radio resource, the second base station and the second service server belong to the second network, the first base station and the first service server belong to a first network, and the second network is different from the first network; and sending, by the second service server, first notification information to the first service server, where the first notification information is used for reporting that the target network resource has been invoked for the first base station.

With reference to the eighth aspect, in a first possible implementation of the eighth aspect, the sending, by the second service server, first notification information to the first service server includes: when the second notification information carries a network identifier of the first network, determining, by the second service server, the first service server according to the network identifier; and sending, by the second service server, the first notification information to the first service server after determining the first service server.

According to a ninth aspect, an embodiment of the present invention further provides another radio resource determining apparatus, including: an invocation unit, configured to invoke a radio resource for a first base station, where the radio resource is used by a terminal served by the first base station, to perform a proximity-based service, the radio resource and the second base station belong to a second network, the first base station belongs to a first network, and the second network is different from the first network; and a notification unit, configured to send second notification information to the second service server, where the second notification information is used for reporting that the second base station has invoked the radio resource for the first base station, and the second service server belongs to the second network.

With reference to the ninth aspect, in a first possible implementation of the ninth aspect, the invocation unit is specifically configured to invoke, for the first base station, a candidate resource available for the proximity-based service, where the candidate resource includes the radio resource.

With reference to the ninth aspect or the first possible implementation of the ninth aspect, in a second possible implementation of the ninth aspect, the second notification information carries a network identifier of the first network.

With reference to any one of the ninth aspect, or the first and second possible implementations of the ninth aspect, in a third possible implementation of the ninth aspect, the second notification information carries invocation information of the radio resource.

With reference to the third possible implementation of the ninth aspect, in a fourth possible implementation of the ninth aspect, the invocation information includes at least one type of the following information: a frequency of the radio resource, bandwidth of the radio resource, or invocation duration of the radio resource.

According to a tenth aspect, an embodiment of the present invention further provides another radio resource determining apparatus, including: a receiving unit, configured to receive second notification information sent by a second base station, where the second notification information is used for reporting that the second base station invokes a radio resource for a first base station, so that a terminal that accesses the first base station performs a proximity-based service by using the radio resource, the second base station and the second service server belong to the second network, the first base station and the first service server belong to a first network, and the second network is different from the first network; and a sending unit, configured to send first notification information to the first service server, where the first notification information is used for reporting that the target network resource has been invoked for the first base station.

With reference to the tenth aspect, in a first possible implementation of the tenth aspect, the sending unit includes: a determining subunit, configured to: when the second notification information carries a network identifier of the first network, determine the first service server according to the network identifier; and a sending subunit, configured to: after the first service server is determined, send the first notification information to the first service server.

According to an eleventh aspect, an embodiment of the present invention further provides another radio resource determining method, including: invoking, by a first base station, a radio resource used for a proximity-based service from a second base station, where the second base station belongs to the second network, the first base station belongs to a first network, and the second network is different from the first network; and allocating, by the first base station, the radio resource to a terminal served by the first base station, where the radio resource is used by the terminal to perform the proximity-based service by using the radio resource.

With reference to the eleventh aspect, in a first possible implementation of the eleventh aspect, the method further includes: sending, by a first base station, third notification information to a first service server, where the third notification information is used for reporting that the first base station has invoked the radio resource from the second network, and the first service server belongs to the first network.

With reference to the eleventh aspect, in a second possible implementation of the eleventh aspect, the invoking, by a first base station, a radio resource used for a proximity-based service from a second base station includes: selecting, by the first base station through negotiation with the second base station, the radio resource from a candidate resource that is available for the proximity-based service and that is of the second base station.

With reference to any one of the eleventh aspect, or the first and second possible implementations of the eleventh aspect, in a third possible implementation of the eleventh aspect, the third notification information carries a network identifier of the second network.

With reference to any one of the eleventh aspect, or the first to third possible implementations of the eleventh aspect, in a fourth possible implementation of the eleventh aspect, the third notification information carries invocation information of the radio resource.

With reference to the fourth possible implementation of the eleventh aspect, in a fifth possible implementation of the eleventh aspect, the invocation information includes at least one type of the following information: a frequency of the radio resource, bandwidth of the radio resource, or invocation duration of the radio resource.

According to a twelfth aspect, an embodiment of the present invention further provides another radio resource determining method, including: receiving, by a first service server, third notification information sent by a first base station, where the third notification information is used for reporting that the first base station has invoked a radio resource from a second network, so that a terminal that accesses the first base station performs a proximity-based service by using the radio resource, the first service server and the first base station belong to the first network, the radio resource belongs to the second network, and the second network is different from the first network.

With reference to the twelfth aspect, in a first possible implementation of the twelfth aspect, sending, by the second service server, first notification information to the first service server includes: when the third notification information carries a network identifier, determining, by the first service server, the second service server according to the network identifier; and sending, by the first service server, the first notification information to the second service server after determining the second service server.

According to a thirteenth aspect, an embodiment of the present invention further provides another radio resource determining apparatus, including: an invocation unit, configured to invoke a radio resource used for a proximity-based service from a second base station. The second base station belongs to the second network, the first base station belongs to a first network, and the second network is different from the first network; and an allocation unit, configured to allocate the radio resource to a terminal served by the first base station, where the radio resource is used by the terminal to perform the proximity-based service by using the radio resource.

With reference to the thirteenth aspect, in a first possible implementation of the thirteenth aspect, the apparatus further includes: a sending unit, configured to send third notification information to a first service server, where the third notification information is used for reporting that the first base station has invoked the radio resource from the second network, and the first service server belongs to the first network.

With reference to the thirteenth aspect, in a second possible implementation of the thirteenth aspect, the invocation unit is specifically configured to select, through negotiation with the second base station, the radio resource from a candidate resource that is available for the proximity-based service and that is of the second base station.

With reference to any one of the thirteenth aspect, or the first and second possible implementations of the thirteenth aspect, in a third possible implementation of the thirteenth aspect, the third notification information carries a network identifier of the second network.

With reference to any one of the thirteenth aspect, or the first to third possible implementations of the thirteenth aspect, in a fourth possible implementation of the thirteenth aspect, the third notification information carries invocation information of the radio resource.

With reference to the fourth possible implementation of the thirteenth aspect, in a fifth possible implementation of the thirteenth aspect, the invocation information includes at least one type of the following information: a frequency of the radio resource, bandwidth of the radio resource, or invocation duration of the radio resource.

According to a fourteenth aspect, an embodiment of the present invention further provides another radio resource determining apparatus, including: a receiving unit, configured to receive third notification information sent by a first base station, where the third notification information is used for reporting that the first base station has invoked a radio resource from a second network, so that a terminal that accesses the first base station performs a proximity-based service by using the radio resource, the first service server and the first base station belong to the first network, the radio resource belongs to the second network, and the second network is different from the first network; and a sending unit, configured to send fourth notification information to a second service server, where the fourth notification information is used for reporting that the target network resource has been invoked for the first base station, and the first service server belongs to the first network.

With reference to the fourteenth aspect, in a first possible implementation of the fourteenth aspect, the sending unit includes: a determining subunit, configured to: when the third notification information carries a network identifier, determine the second service server according to the network identifier; and a sending subunit, configured to send the first notification information to the second service server after the second service server is determined.

In the embodiments of the present invention, the terminal selects the radio resource used for the proximity-based service from the candidate resource; and the terminal sends the report information to the first service server, where the report information is used for reporting that the terminal is to perform the proximity-based service by using the radio resource, and is used by the service server of the network to which the radio resource belongs to manage the proximity-based service of the terminal, and the first service server is the service server in the home network of the terminal. According to the embodiments of the present invention, the terminal selects the radio resource used for performing the proximity-based service, so as to avoid a time loss caused by allocation of the radio resource to the terminal by the base station, thereby improving efficiency of performing the proximity-based service by the terminal.

BRIEF DESCRIPTION OF DRAWINGS

To describe the technical solutions in the embodiments of the present invention more clearly, the following briefly describes the accompanying drawings required for describing the embodiments or the prior art. Apparently, a person of ordinary skill in the art may still derive other drawings from these accompanying drawings without creative efforts.

DESCRIPTION OF EMBODIMENTS

In the embodiments of the present invention, a proximity-based service includes two modes: a proximity-based discovery and proximity-based communication. In the proximity-based discovery, a terminal can find surrounding interesting service information. Terminals that participate in the proximity-based discovery mainly have two roles: a broadcaster and a listener. The broadcaster broadcasts information, and the listener listens to the information. If information broadcast by a broadcaster is listened to by a listener, and the information is exactly information needed by the listener, a successful proximity-based discovery can be implemented. For example, if content broadcast by a broadcaster is a hotel, and a listener is looking for the hotel, a proximity-based discovery can be implemented after the listener receives the broadcast content.

In the embodiments of the present invention, a radio resource may refer to a frequency band, a frequency, or the like that can be used for wireless communication. That the radio resource belongs to a network may mean that a wireless communications device that belongs to the network may perform communication by using the radio resource. For example, if a network operator rents a frequency band to perform network communication, it may be considered that the frequency band belongs to a network of the operator.

In the embodiments of the present invention, the network may be a public land mobile network (PLMN for short), and when the network is the PLMN, a network identifier may be a PLMN ID of the PLMN. A first network and a second network may be different PLMNs, and the first network and the second network may be operated by a different operator, or may be operated by a same operator. A communications device included in the first network may perform communication by using a radio resource that belongs to a first network device, or may roam to the second network and perform communication by using a radio resource that belongs to the second network.

In the embodiments of the present invention, the service server may be a proximity-based service server (ProSe Function) or a network device related to implementation of the proximity-based service. A first service server is a service server that belongs to the first network, and a second service server is a service server that belongs to the second network.

In the embodiments of the present invention, the terminal may be user equipment (UE for short) such as a mobile phone, a tablet computer, or an in-vehicle computer. A home network of the terminal may be the first network.

Figure 1:
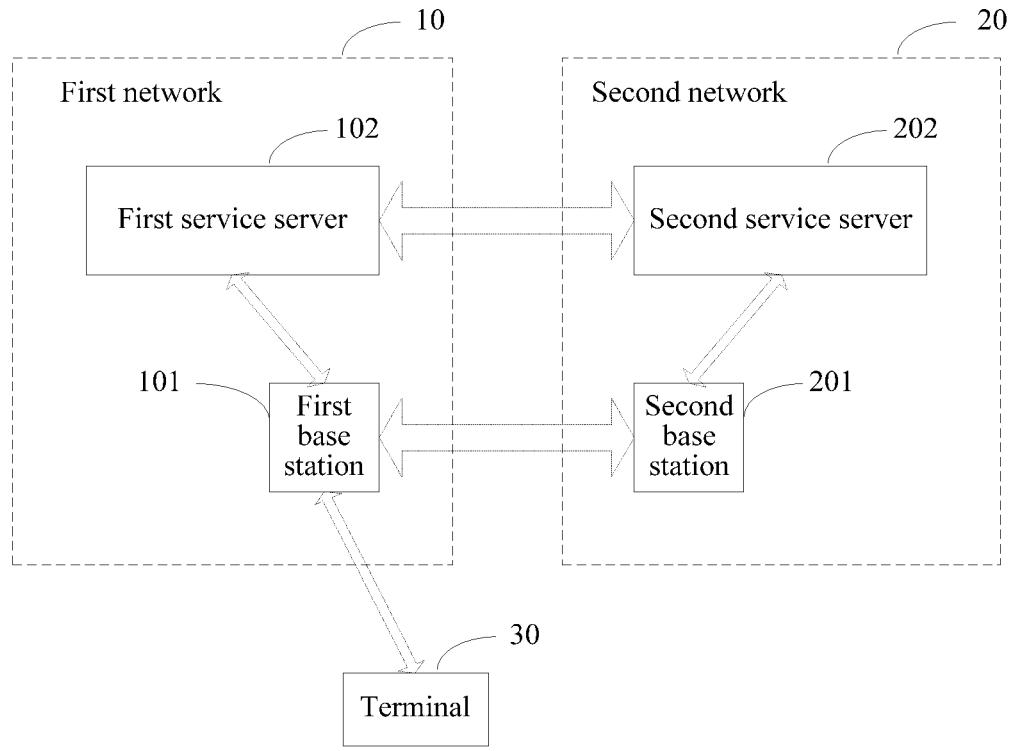
FIG. 1 is a schematic structural diagram of a wireless communications system according to an embodiment of the present invention.

Referring to FIG. 1, FIG. 1 is a schematic structural diagram of a wireless communications system according to an embodiment of the present invention. As shown in FIG. 1, the wireless communications system may include a first network 10 and a second network 20. The first network 10 includes a first base station 101 and a first service server 102. The second network 20 includes a second base station 201 and a second service server 202. The terminal 30 accesses the first base station 101, and the first base station 101 provides a service for the terminal 30. In each network, wireless communication is performed by using a respective radio resource. There may be one or more second networks and one or more first networks, and a home network of the terminal 30 may be the first network 10.

Figure 2:
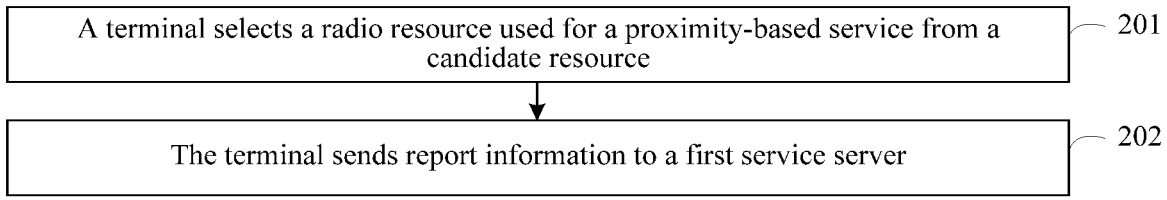
FIG. 2 is a schematic flowchart of a radio resource determining method according to an embodiment of the present invention.

Referring to FIG. 2, FIG. 2 is a schematic flowchart of a radio resource determining method according to an embodiment of the present invention. The method may be performed by a terminal.

Step 201: The terminal selects a radio resource used for a proximity-based service from a candidate resource.

When a predetermined condition is satisfied, the terminal may obtain the radio resource used for the proximity-based service from the candidate network resource. The candidate resource includes at least a group of radio resources available for the proximity-based service, and the radio resource may belong to a first network, or may belong to another second network. The candidate network resource may be allocated to the terminal in advance by a base station accessed by the terminal, or may be a set of radio resources that have been used by the terminal to perform the proximity-based service.

For example, the candidate resource may include a plurality of frequencies available for the proximity-based service, and the frequencies may belong to the second network, or may belong to the first network. The candidate resource may be configured for the terminal by the base station accessed by the terminal, or may be obtained by the terminal in another manner. The terminal may select one frequency from the plurality of frequencies to perform the proximity-based service.

Optionally, that a predetermined condition is satisfied may mean that the terminal receives authorization information. The authorization information is network information used for indicating that the terminal is allowed to perform the proximity-based service. The terminal may first receive authorization information sent by a first service server; and then select the radio resource from the candidate resource according to the authorization information. Generally, the authorization information may carry network information. The terminal may select the candidate resource as the radio resource when network information corresponding to the candidate resource is the same as the network information carried in the authorization information. The network information may be a network identifier. The network information corresponding to the candidate resource may be a network identifier of a network to which the candidate resource belongs.

For example, when the candidate resource includes three frequencies, and the three frequencies respectively belong to a network A, a network B, and a network C, if the authorization information carries a PLMN ID 1, and the PLMN ID 1 corresponds to the network A, the terminal may select a frequency that belongs to the network A as a frequency for performing the proximity-based service; or if the authorization information carries a PLMN ID 1 and a PLMN ID 2, the PLMN ID 1 corresponds to the network A, and the PLMN ID 2 corresponds to the network B, the terminal may select a frequency that belongs to the network A as a frequency for performing the proximity-based service, or may select a frequency that belongs to the network B as a frequency for performing the proximity-based service. One of the network A, the network B, or the network C may be a home network of the terminal, and the other two networks are networks other than the home network of the terminal; or all of the network A, the network B, and the network C are networks other than a home network of the terminal.

Step 202: The terminal sends report information to a first service server, where the report information is used for reporting that the terminal is to perform the proximity-based service by using the radio resource.

After selecting the radio resource, the terminal may send the report information to the first service server, to report, by using the report information, a case in which the terminal has performed or is performing the proximity-based service by using the radio resource, so that a service server of a network to which the radio resource belongs manages the proximity-based service of the terminal. The service server of the network to which the radio resource belongs may be a second service server or may be the first service server. Specifically, when the radio resource belongs to the first network, a service server of the first network, that is, a first network device, may manage the proximity-based service of the terminal; or when the radio resource belongs to the second network, the first service server may forward content included in the report information to a service server of the second network, that is, a second network device, and then the second service server manages the proximity-based service of the terminal. The managing the proximity-based service of the terminal includes an operation such as controlling, charging for, or usage metering on the proximity-based service of the terminal.

The report information may carry a network identifier of the network to which the radio resource belongs, and the network identifier is used to indicate which candidate resource is selected by the terminal to perform the proximity-based service. When the radio resource belongs to the second network, the network identifier is a network identifier of the second network. When the radio resource belongs to the first network, the network identifier is a network identifier of the first network.

For example, when the terminal selects a candidate resource that belongs to the network A as the radio resource used for the proximity-based service, the report information may carry the PLMN ID 1; or when the terminal selects a candidate resource that belongs to the network B as the radio resource used for the proximity-based service, the report information may carry the PLMN ID 2.

To help the service server charge for or perform usage metering on the proximity-based service of the terminal, the report information may further include invocation information of the radio resource. The invocation information is used for describing a usage status of the radio resource. Generally, the invocation information may include at least one type of the following information: a frequency of the radio resource, bandwidth of the radio resource, or invocation duration of the radio resource. The invocation duration of the radio resource is duration of performing the proximity-based service by the terminal by using the radio resource.

To help the service server charge for or perform usage metering on the proximity-based service of the terminal, the report information may further include information about the proximity-based service, including a type of the proximity-based service, a start time and/or an end time of the proximity-based service, and the like. The type of the proximity-based service includes: a public security service and/or a non-public security service. If the type of the proximity-based service is the public security service, the type of the proximity-based service may be a relay service or a discovery/communication service between group members.

After sending the report information to the service server, the terminal may further receive a response message sent by the service server. The response message may indicate that the service server has learned of the radio resource selected by the terminal, and may be further used for indicating whether the terminal can perform the proximity-based service by using the radio resource.

Optionally, in addition to sending the report information to the service server, the terminal may further perform the proximity-based service by using the radio resource. Generally, after receiving the response message and determining, according to the response message, that the proximity-based service can be performed by using the radio resource, the terminal may perform the proximity-based service by using the radio resource.

It should be noted herein that, in this embodiment of the present invention, a chronological order of sending the report information by the terminal and starting to perform the proximity-based service by the terminal is not limited.

The terminal may start to perform the proximity-based service before sending the report information, or may start to perform the proximity-based service after sending the report information.

According to this embodiment, the terminal can select the radio resource used for the proximity-based service on its own, so as to avoid a time loss caused by allocation of the radio resource to the terminal by the base station, thereby improving efficiency of performing the proximity-based service by the terminal.

Figure 3:
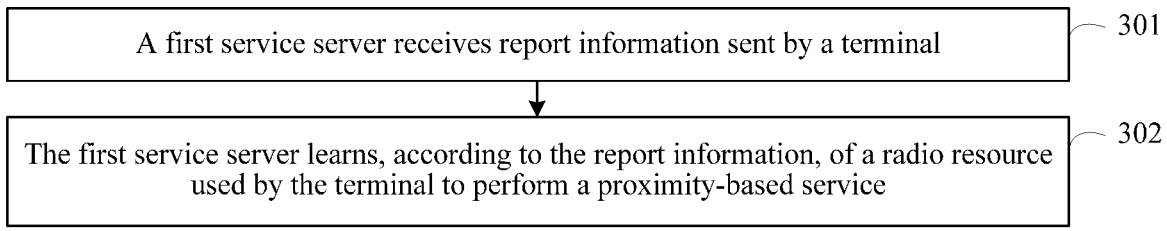
FIG. 3 is another schematic flowchart of a radio resource determining method according to an embodiment of the present invention.

Referring to FIG. 3, FIG. 3 is another schematic flowchart of a radio resource determining method according to an embodiment of the present invention. Corresponding to the method shown in FIG. 2, the method may be performed by a service server.

Step 301: A first service server receives report information sent by a terminal, where the report information is used for reporting that the terminal is to perform a proximity-based service by using a radio resource, and the radio resource is selected by the terminal from a candidate resource.

For content included in the report information and a function of the content, refer to the foregoing embodiment. Details are not described herein again.

Step 302: The first service server learns, according to the report information, of the radio resource used by the terminal to perform the proximity-based service.

After receiving the report information, the first service server may learn, according to the content included in the report information, of the radio resource selected by the terminal and used for performing the proximity-based service, so as to correspondingly manage the proximity-based service of the terminal. For example, when the radio resource belongs to a first network, the first service server may learn, according to the report information, of a frequency of the radio resource and duration of performing the proximity-based service by the terminal by using the radio resource, so that the first service server may charge for or perform usage metering on the proximity-based service of the terminal.

The first service server may further send a response message to the terminal. The response message may be used for indicating that the first network device has received the report information. The terminal is incapable of verifying whether a target network resource can be used for the proximity-based service. To prevent that the radio resource cannot be used for performing the proximity-based service of the terminal due to a reason such as that the radio resource has been allocated for other purposes, after receiving the report information, the first service server may further detect whether the terminal can perform the proximity-based service by using the radio resource, and a response message or another message is used to indicate whether the terminal can perform the proximity-based service by using the radio resource.

When the report information includes a network identifier, the first service server detects whether the terminal can use a radio resource of a network corresponding to the network identifier, and send a detection result to the terminal by using the response information.

For example, when the first service server determines, according to the network identifier, that the radio resource belongs to a second network, the first service server may determine, through interaction with a second service server that belongs to the second network, whether the terminal can perform the proximity-based service by using the radio resource.

After determining that the terminal can perform the proximity-based service by using the radio resource, if determining, according to the network identifier, that the radio resource does not belong to the first network but belongs to the second network, the first service server may further send notification information to the second service server. The notification information is used for reporting that the terminal is to perform the proximity-based service by using the radio resource. Therefore, when the radio resource belongs to the second network, the second service server may charge for or perform usage metering on the proximity-based service that uses the radio resource.

According to this embodiment, the terminal can select the radio resource used for the proximity-based service on its own, so as to avoid a time loss caused by allocation of the radio resource to the terminal by a base station, thereby improving efficiency of performing the proximity-based service by the terminal.

Figure 4:
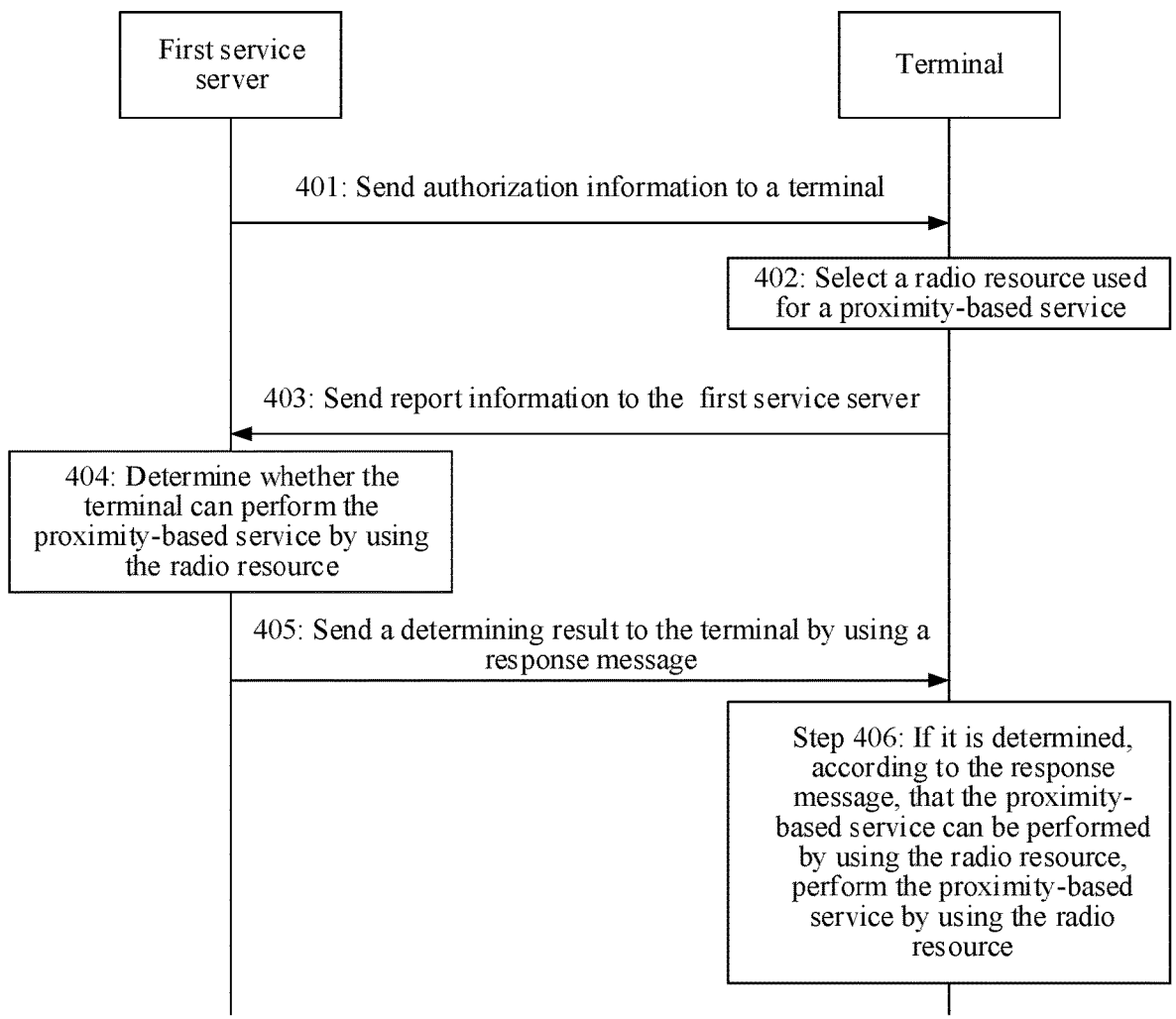
FIG. 4 is another schematic flowchart of a radio resource determining method according to an embodiment of the present invention.

Referring to FIG. 4, FIG. 4 is another schematic flowchart of a radio resource determining method according to an embodiment of the present invention. The following further describes the present invention with reference to a specific example.

Step 401: A first service server sends authorization information to a terminal, where the authorization information carries a network identifier.

Step 402: When a network identifier of a network A is the same as the network identifier carried in the authorization information, the terminal selects a candidate resource that belongs to the network A as a radio resource used for a proximity-based service.

The candidate resource may be allocated to the terminal in advance by a base station accessed by the terminal, that is, a first base station.

Step 403: After selecting the candidate resource that belongs to the network A as the radio resource used for the proximity-based service, the terminal sends report information to the first service server.

The report information is used for indicating that the terminal is to perform the proximity-based service by using the radio resource that belongs to the network A. In addition, the report information may further include information such as a frequency of the radio resource, bandwidth of the radio resource, or invocation duration of the radio resource.

Step 404: After receiving the report information, the first service server may determine whether the terminal can perform the proximity-based service by using the radio resource.

Step 405: The first service server sends a determining result to the terminal by using a response message.

Step 406: After the terminal receives the response message, if it is determined, according to the response message, that the proximity-based service can be performed by using the radio resource, the terminal performs the proximity-based service by using the radio resource.

In addition, if it is determined, according to the response message, that the proximity-based service cannot be performed by using the radio resource, the terminal may select a radio resource used for a proximity-based service from a candidate resource, that is, the terminal may go back to step 402.

According to this embodiment, the terminal selects the radio resource used for performing the proximity-based service, so as to avoid a time loss caused by allocation of the radio resource to the terminal by the base station, thereby improving efficiency of performing the proximity-based service by the terminal.

In addition to that the terminal selects the radio resource used for performing the proximity-based service, the first base station may allocate a radio resource that belongs to the second network to the terminal to serve as the radio resource, so that the radio resource can be fully utilized.

When a base station allocates, to a terminal, a radio resource used for a proximity-based service, the base station can learn of only that which radio resources of a network to which the base station belongs can be used for performing the proximity-based service. Therefore, the base station can allocate, for the proximity-based service, only a radio resource of the network to which the base station belongs. For example, when a base station that belongs to a network of a mobile operator A allocates a radio resource used for a proximity-based service, the base station can learn of only a radio resource that belongs to the network of the mobile operator A. Therefore, the base station can allocate, for the proximity-based service, only the radio resource that belongs to the network of the mobile operator A. Similarly, a base station that belongs to a network of a mobile operator B can allocate, for a proximity-based service, only a radio resource that belongs to the mobile operator B. To increase a quantity of radio resources available for a proximity-based service for a terminal, an embodiment of the present invention further provides a radio resource determining method. A base station may use the method in the following embodiment to allocate, to the terminal, a radio resource used for the proximity-based service, or allocate, to the terminal, a candidate resource used for the proximity-based service.

Figure 5:
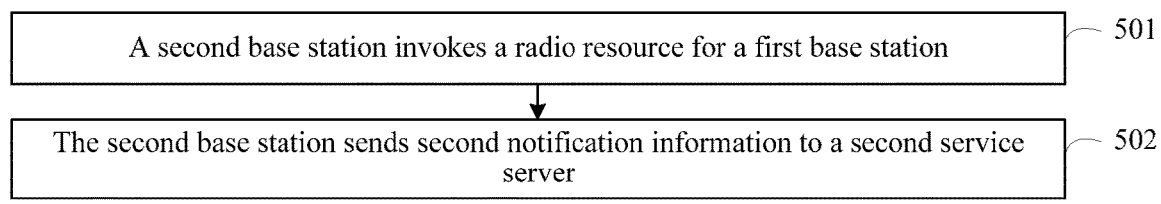
FIG. 5 is another schematic flowchart of a radio resource determining method according to an embodiment of the present invention.

Referring to FIG. 5, FIG. 5 is another schematic flowchart of a radio resource determining method according to an embodiment of the present invention. This embodiment may be performed by a second base station.

Step 501: The second base station invokes a radio resource for a first base station, so that a terminal served by the first base station performs a proximity-based service by using the radio resource.

The second base station may invoke, through negotiation with the first base station, a radio resource for the first base station from a radio resource that is available for the proximity-based service and that is of the second base station. In a specific implementation, the second base station may invoke only the radio resource for the first base station, or may invoke a plurality of groups of candidate resources including the radio resource for the first base station. Each group of candidate resources may be used for performing the proximity-based service.

After invoking the radio resource from the second base station, the first base station may allocate the radio resource to a terminal that accesses the first base station, so that the terminal may perform the proximity-based service by using the radio resource. The first base station may directly indicate the radio resource to the terminal, or may indicate each candidate resource to the terminal, and then the terminal selects, from the candidate resource, the radio resource used for performing the proximity-based service. For a manner in which the first base station directly allocates the radio resource to the terminal, refer to the prior art. Alternatively, for a specific manner in which the terminal selects, from the candidate resource after the base station indicates each candidate resource to the terminal, the radio resource used for performing the proximity-based service, refer to the foregoing embodiment. Details are not described herein again.

Step 502: The second base station sends second notification information to a second service server, where the second notification information is used for reporting that the second base station has invoked the radio resource for the first base station, and the second service server belongs to the second network.

After invoking the radio resource for the first base station, the second base station may further send the second notification information to the second service server. The second notification information is used for reporting that the second base station has invoked the radio resource for the first base station. The second notification information is sent to the second service server, so that the second service server can learn that the radio resource has been invoked for the first base station, thereby implementing subsequent management on use of the radio resource, such as performing charging or performing usage metering, and avoiding an invocation conflict caused by a reason that different devices uses a same radio resource for different purposes.

Generally, a plurality of networks coexist in an area in which the second base station is located. To help the second service server determine a network to which the radio resource belongs, the second notification information may carry a network identifier of the first network, so that the second service server determines, according to the network identifier, the network to which the radio resource belongs. In addition to the network identifier, the second notification information may further carry invocation information of the radio resource. The invocation information is used for indicating a specific invocation status of the radio resource, for example, may include a frequency of the radio resource, bandwidth of the radio resource, or invocation duration of the radio resource.

According to this embodiment, the second base station may allocate the radio resource to the terminal in the second network to implement the proximity-based service, and the second base station may further invoke the radio resource for the first base station through interaction with the first base station, so that the terminal that accesses the first base station implements the proximity-based service by using the radio resource, thereby fully improving utilization of the radio resource available for proximity-based communication.

Figure 6:
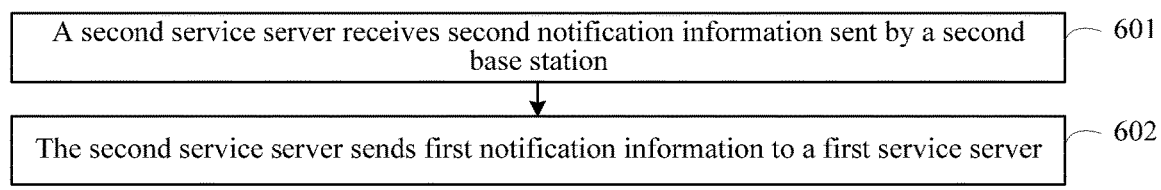
FIG. 6 is another schematic flowchart of a radio resource determining method according to an embodiment of the present invention.

Referring to FIG. 6, FIG. 6 is another schematic flowchart of a radio resource determining method according to an embodiment of the present invention. Corresponding to the method shown in FIG. 5, this embodiment may be performed by a second service server.

Step 601: The second service server receives second notification information sent by a second base station, where the second notification information is used for reporting that the second base station invokes a radio resource for a first base station, so that a terminal that accesses the first base station performs a proximity-based service by using the radio resource.

For content included in the second notification information and a function of the content, refer to the foregoing embodiment. Details are not described herein again.

Step 602: The second service server sends first notification information to a first service server, where the first notification information is used for reporting that the target network resource has been invoked for the first base station.

When the second notification information carries a network identifier, the second service server determines a first network according to the network identifier, and further determines the first service server according to the first network. The second service server sends the first notification information to the first service server after determining the first service server. The first notification information is sent to the first service server, so that the first service server can learn that the first base station has invoked the radio resource to perform the proximity-based service.

According to this embodiment, the second service server receives the second notification information and sends the first notification information to the first service server, so that the terminal that accesses the first base station can implement the proximity-based service by using the radio resource, thereby fully improving utilization of the radio resource, and fully utilizing the radio resource available for proximity-based communication.

Figure 7:
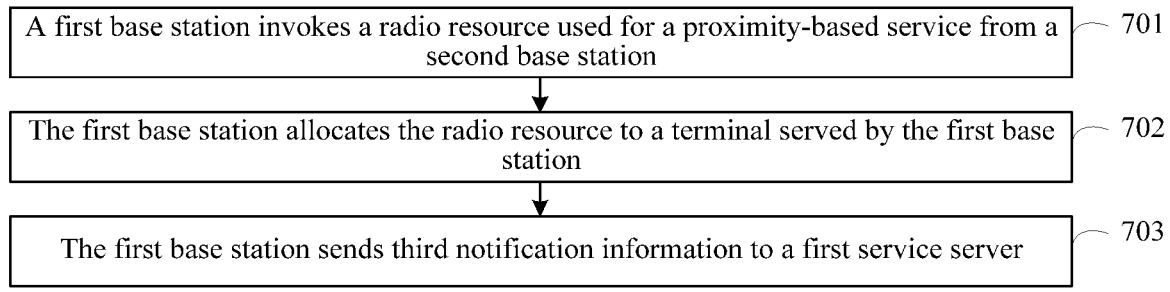
FIG. 7 is another schematic flowchart of a radio resource determining method according to an embodiment of the present invention.

Referring to FIG. 7, FIG. 7 is another schematic flowchart of a radio resource determining method according to an embodiment of the present invention. This embodiment may be performed by a first base station.

Step 701: The first base station invokes a radio resource used for a proximity-based service from a second base station.

The second base station may invoke, through negotiation with the first base station, a radio resource for the first base station from a radio resource that is available for the proximity-based service and that is of the second base station. In a specific implementation, the second base station may invoke only the radio resource for the first base station, or may invoke a plurality of groups of candidate resources including the radio resource for the first base station. Each group of candidate resources may be used for performing the proximity-based service.

Step 702: The first base station allocates the radio resource to a terminal served by the first base station, so that the terminal performs the proximity-based service by using the radio resource.

After invoking the radio resource from the second base station, the first base station may allocate the radio resource to a terminal that accesses the first base station, so that the terminal may perform the proximity-based service by using the radio resource. For a manner in which the first base station allocates the radio resource to the terminal, refer to the prior art or refer to the foregoing embodiment. Details are not described herein again.

After invoking the radio resource, the first base station further needs to notify a service server that the first base station has invoked the radio resource. Therefore, as shown in FIG. 7, the method may further include:

Step 703: The first base station sends third notification information to a first service server.

The third notification information is used for reporting that the first base station has invoked the radio resource from a second network, so that the first network device can learn that the first base station has invoked the radio resource from the second network. The third notification information is sent to the first service server, so that the first service server can learn that the radio resource has been invoked for the first base station.

Generally, a plurality of networks coexist in an area in which the first base station is located. To help the first service server determine a network to which the radio resource belongs, the third notification information may carry a network identifier of the second network, so that the first service server determines, according to the network identifier, the network to which the radio resource belongs.

In addition to the network identifier, the third notification information may further carry invocation information of the radio resource. The invocation information is used for indicating a specific invocation status of the radio resource. For example, the invocation information may include information such as a frequency band of the radio resource, or duration of invocation of the radio resource for the first base station.

According to this embodiment, when the radio resource that belongs to the first network is insufficient, the first base station may invoke, through interaction with the second base station, the radio resource available for the proximity-based service, so that the terminal that accesses the first base station can perform the proximity-based service by using the radio resource, thereby improving utilization of the radio resource, and fully utilizing the radio resource available for proximity-based communication.

Figure 8:
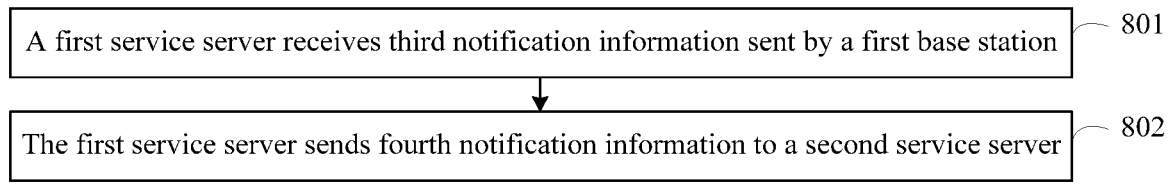
FIG. 8 is another schematic flowchart of a radio resource determining method according to an embodiment of the present invention.

Referring to FIG. 8, FIG. 8 is another schematic flowchart of a radio resource determining method according to an embodiment of the present invention. This embodiment may be performed by a first service server.

Step 801: The first service server receives third notification information sent by a first base station, where the third notification information is used for reporting that the first base station has invoked a radio resource from a second network, so that a terminal that accesses the first base station performs a proximity-based service by using the radio resource.

For content included in the third notification information and a function of the content, refer to the foregoing embodiment. Details are not described herein again.

Step 802: The first service server sends fourth notification information to a second service server, where the fourth notification information is used for reporting that the target network resource has been invoked for the first base station, and the first service server belongs to a first network.

When the third notification information carries a network identifier, the first service server may determine the second network according to the network identifier, and further determine the second service server according to the second network. The first service server may send fourth notification information to the second service server after determining the second service server. The first service server sends the fourth notification information to the second service server, so that the second service server can learn that the first base station has invoked the radio resource from the second network to perform the proximity-based service.

According to this embodiment, the first service server receives the third notification information and sends the fourth notification information to the second service server, so that the terminal that accesses the first base station can implement the proximity-based service by using the radio resource, thereby fully improving utilization of the radio resource, and fully utilizing the radio resource available for proximity-based communication.

Figure 9:
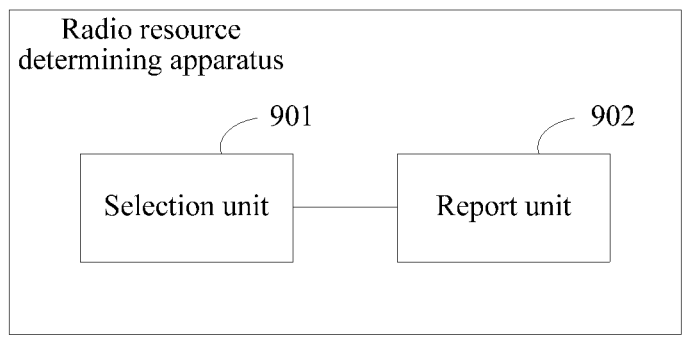
FIG. 9 is a schematic structural diagram of a radio resource determining apparatus according to an embodiment of the present invention.

Referring to FIG. 9, FIG. 9 is a schematic structural diagram of a radio resource determining apparatus according to an embodiment of the present invention. The apparatus may be configured to perform the radio resource determining method shown in FIG. 2.

As shown in FIG. 9, the apparatus may include a selection unit 901 and a report unit 902.

The selection unit 901 is configured to select a radio resource used for a proximity-based service from a candidate resource.

The report unit 902 is configured to send report information to a first service server. The report information is used for reporting that the terminal is to perform the proximity-based service by using the radio resource, and is used by a service server of a network to which the radio resource belongs to manage the proximity-based service of the terminal. The first service server is a service server in a home network of the terminal. The report information may carry a network identifier of the network to which the radio resource belongs.

Optionally, the selection unit 901 includes: a receiving subunit, configured to receive authorization information sent by the first service server, where the authorization information is network information used for indicating that the terminal is allowed to perform the proximity-based service; and a selection subunit, configured to select the radio resource from the candidate resource according to the authorization information.

Optionally, the selection subunit is specifically configured to select the candidate resource as the radio resource when network information corresponding to the candidate resource is the same as the network information carried in the authorization information.

Optionally, the apparatus may further include: an execution unit, configured to perform the proximity-based service by using the radio resource.

Optionally, the apparatus may further include: a receiving unit, configured to receive a response message sent by the first service server. The response message is used for indicating whether the terminal can perform the proximity-based service by using the radio resource.

When the apparatus includes the receiving unit, the execution unit may be further configured to: when it is determined, according to the response message, that the proximity-based service can be performed by using the radio resource, perform the proximity-based service by using the radio resource.

Figure 10:
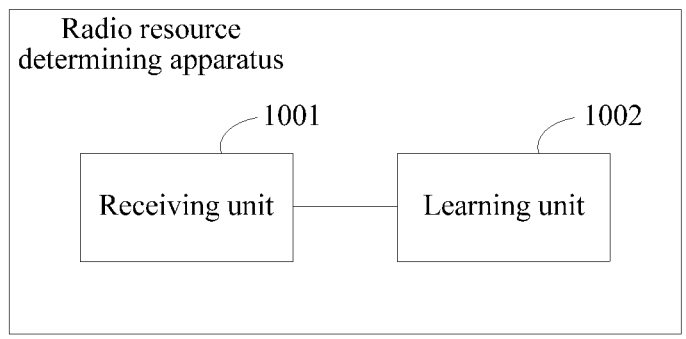
FIG. 10 is another schematic structural diagram of a radio resource determining apparatus according to an embodiment of the present invention.

Referring to FIG. 10, FIG. 10 is another schematic structural diagram of a radio resource determining apparatus according to an embodiment of the present invention. The apparatus may be configured to perform the radio resource determining method shown in FIG. 3.

As shown in FIG. 10, the apparatus may include a receiving unit 1001 and a learning unit 1002.

The receiving unit 1001 is configured to receive report information sent by a terminal. The report information is used for reporting that the terminal is to perform a proximity-based service by using a radio resource. The radio resource is selected by the terminal from a candidate resource.

The learning unit 1002 is configured to learn, according to the report information, of the radio resource used by the terminal to perform the proximity-based service.

Optionally, the apparatus may further include: a detection unit, configured to detect whether the terminal can perform the proximity-based service by using the radio resource; and a sending unit, configured to send a response message to the terminal. The response message is used for indicating whether the terminal can perform the proximity-based service by using the radio resource.

Optionally, the detection unit is specifically configured to: when the report information includes a network identifier, detect whether the terminal can perform the proximity-based service by using a radio resource of a network corresponding to the network identifier.

Optionally, the sending unit is further configured to: when the radio resource does not belong to a network to which the first network device belongs, send notification information to a second service server. The notification information is used for reporting that the terminal is to perform the proximity-based service by using the radio resource. The second service server belongs to the network corresponding to the network identifier.

Figure 11:
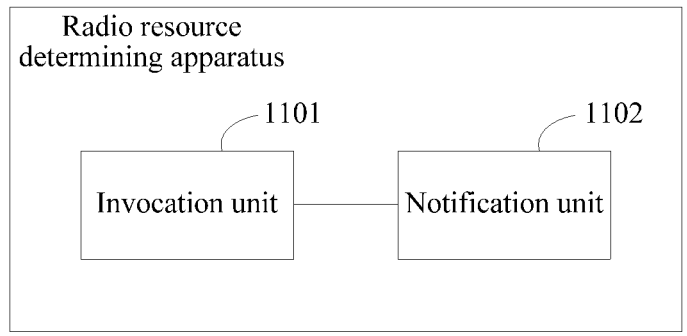
FIG. 11 is another schematic structural diagram of a radio resource determining apparatus according to an embodiment of the present invention.

Referring to FIG. 11, FIG. 11 is another schematic structural diagram of a radio resource determining apparatus according to an embodiment of the present invention. The apparatus may be configured to perform the radio resource determining method shown in FIG. 5.

As shown in FIG. 11, the apparatus may include an invocation unit 1101 and a notification unit 1102.

The invocation unit 1101 is configured to invoke a radio resource for a first base station. The radio resource is used by a terminal served by the first base station, to perform a proximity-based service. The radio resource and the second base station belong to a second network, the first base station belongs to a first network, and the second network is different from the first network.

The notification unit 1102 is configured to send second notification information to the second service server. The second notification information is used for reporting that the second base station has invoked the radio resource for the first base station. The second service server belongs to the second network. The second notification information may carry invocation information of the radio resource. The invocation information may include at least one type of the following information: a frequency of the radio resource, bandwidth of the radio resource, or invocation duration of the radio resource.

Optionally, the invocation unit 1101 is specifically configured to invoke, for the first base station, a candidate resource available for the proximity-based service. The candidate resource includes the radio resource.

Figure 12:
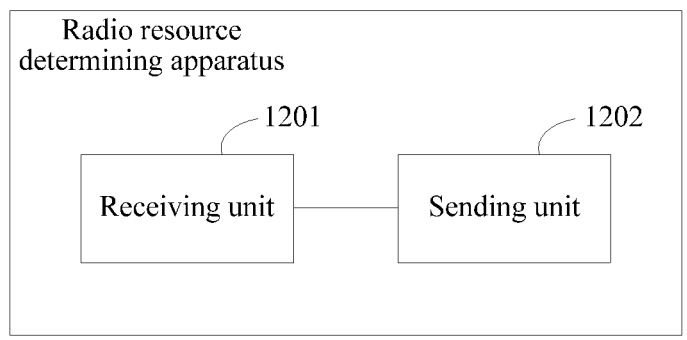
FIG. 12 is another schematic structural diagram of a radio resource determining apparatus according to an embodiment of the present invention.

Referring to FIG. 12, FIG. 12 is another schematic structural diagram of a radio resource determining apparatus according to an embodiment of the present invention. The apparatus may be configured to perform the radio resource determining method shown in FIG. 6.

As shown in FIG. 12, the apparatus may include a receiving unit 1201 and a sending unit 1202.

The receiving unit 1201 is configured to receive second notification information sent by a second base station. The second notification information is used for reporting that the second base station invokes a radio resource for a first base station, so that a terminal that accesses the first base station performs a proximity-based service by using the radio resource. The second base station and the second service server belong to the second network, the first base station and the first service server belong to a first network, and the second network is different from the first network.

The sending unit 1202 is configured to send first notification information to the first service server. The first notification information is used for reporting that the target network resource has been invoked for the first base station.

Optionally, the sending unit 1202 includes: a determining subunit, configured to: when the second notification information carries a network identifier of the first network, determine the first service server according to the network identifier; and a sending subunit, configured to: after the first service server is determined, send the first notification information to the first service server.

Figure 13:
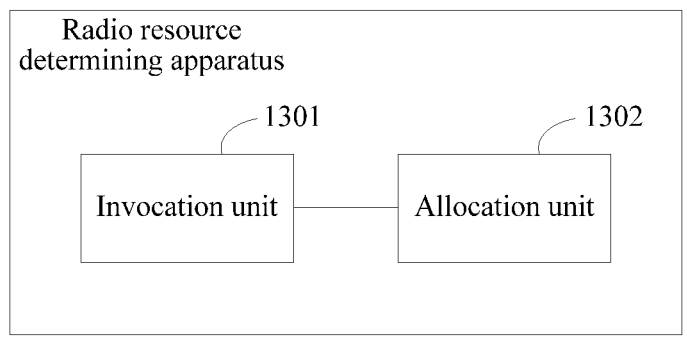
FIG. 13 is another schematic structural diagram of a radio resource determining apparatus according to an embodiment of the present invention.

Referring to FIG. 13, FIG. 13 is another schematic structural diagram of a radio resource determining apparatus according to an embodiment of the present invention. The apparatus may be configured to perform the radio resource determining method shown in FIG. 7.

As shown in FIG. 13, the apparatus may include an invocation unit 1301 and an allocation unit 1302.

The invocation unit 1301 is configured to invoke a radio resource used for a proximity-based service from a second base station. The second base station belongs to the second network, the first base station belongs to a first network, and the second network is different from the first network.

The allocation unit 1302 is configured to allocate the radio resource to a terminal served by the first base station. The radio resource is used by the terminal to perform the proximity-based service by using the radio resource.

Optionally, the apparatus further include: a sending unit, configured to send third notification information to a first service server. The third notification information is used for reporting that the first base station has invoked the radio resource from the second network. The first service server belongs to the first network. The third notification information may carry a network identifier of the second network. The invocation information may include at least one type of the following information: a frequency of the radio resource, bandwidth of the radio resource, or invocation duration of the radio resource.

Optionally, the invocation unit 1301 is specifically configured to select, through negotiation with the second base station, the radio resource from a candidate resource that is available for the proximity-based service and that is of the second base station.

Figure 14:
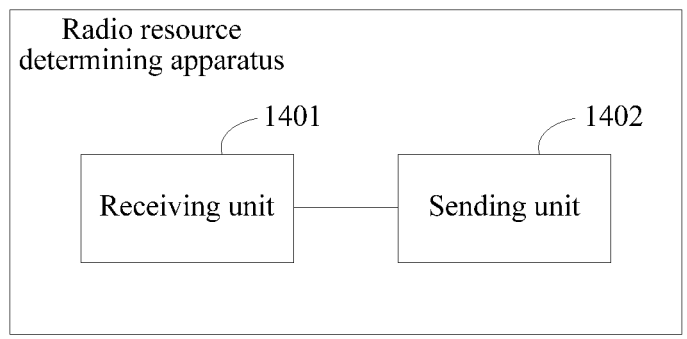
FIG. 14 is another schematic structural diagram of a radio resource determining apparatus according to an embodiment of the present invention.

Referring to FIG. 14, FIG. 14 is another schematic structural diagram of a radio resource determining apparatus according to an embodiment of the present invention. The apparatus may be configured to perform the radio resource determining method shown in FIG. 8.

As shown in FIG. 14, the apparatus may include a receiving unit 1401 and a sending unit 1402.

The receiving unit 1401 is configured to receive third notification information sent by a first base station. The third notification information is used for reporting that the first base station has invoked a radio resource from a second network, so that a terminal that accesses the first base station performs a proximity-based service by using the radio resource. The first service server and the first base station belong to the first network, the radio resource belongs to the second network, and the second network is different from the first network.

The sending unit 1402 is configured to send fourth notification information to a second service server. The fourth notification information is used for reporting that the target network resource has been invoked for the first base station. The first service server belongs to the first network.

Optionally, the sending unit 1402 includes: a determining subunit, configured to: when the third notification information carries a network identifier, determine the second service server according to the network identifier; and a sending subunit, configured to send the first notification information to the second service server after the second service server is determined.

Figure 15:
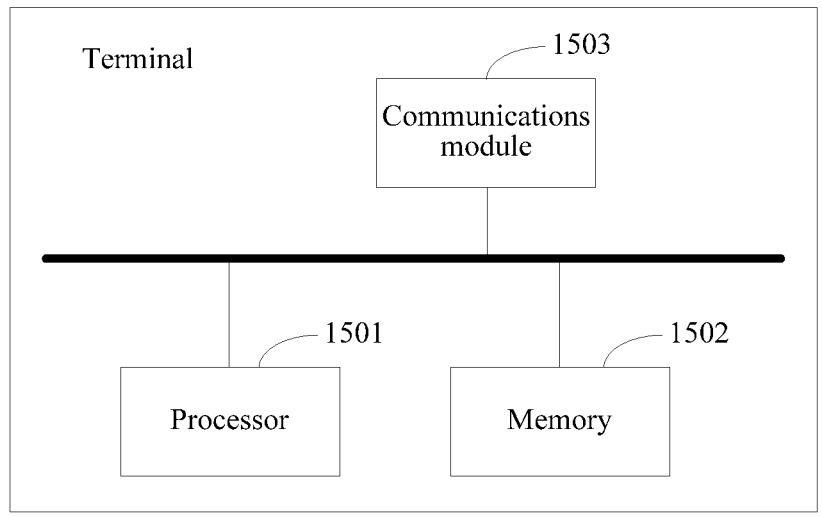
FIG. 15 is a schematic structural diagram of a terminal according to an embodiment of the present invention.

Referring to FIG. 15, FIG. 15 is a schematic structural diagram of a terminal according to an embodiment of the present invention. The terminal may perform the method in the embodiment corresponding to any one of FIG. 1 to FIG. 8.

As shown in FIG. 15, the terminal may include a processor 1501, a memory 1502, and a communications module 1503. These components perform communication by using one or more buses. A person skilled in the art may understand that the structure of a terminal shown in the figure does not constitute any limitation on the present invention. The structure may be a bus-shaped structure or a star-shaped structure, and may further include more or fewer components than those shown in the figure, or a combination of some components, or components deployed differently.

The processor 1501 is a control center of the terminal, uses various interfaces and lines to connect various parts of the entire terminal. The processor 1501 runs or executes software programs and/or modules stored in the memory and invokes data stored in the memory, so as to perform various functions of the terminal and/or process data. The processor may include an integrated circuit (IC for short), for example, may include a single packaged IC, or may include a plurality of connected packaged ICs that have same functions or different functions. For example, the processor may include only a central processing unit (CPU for short), or may be a combination of a GPU, a digital signal processor (DSP for short), and a control chip (such as a baseband chip) in the communications module 1503. In an implementation of the present invention, the CPU may be a single computing core or may include a plurality of computing cores.

The communications module 1503 is configured to establish a communications channel, so that the terminal is connected to a remote server by using the communications channel, and can send data to the remote server or download data from the remote server. The communications module 1503 may include a communications module such as a wireless local area network (wireless LAN for short) module, a Bluetooth module, or a baseband (Base Band) module, and a radio frequency (RF for short) circuit corresponding to the communications module, to perform wireless local area network communication, Bluetooth communication, infrared communication, and/or cellular communications system communication, for example, Wideband Code Division Multiple Access (W-CDMA for short) and/or High Speed Downlink Packet Access (HSDPA for short). The communications module is configured to control communication of various components in the terminal, and may support direct memory access.

The memory 1502 may be configured to store a software program and module, and the processor runs the software program and module that are stored in the memory, so as to perform various function applications of the terminal and implement data processing. The memory mainly includes a program storage area and a data storage area. The program storage area may store an operating system, an application program required by at least one function, such as a sound playback program and an image playback program. The data storage area may store data (such as audio data and an address book) or the like created according to use of the terminal. In a specific implementation of the present invention, the memory may include a volatile memory, such as a nonvolatile random access memory (NVRAM for short), a phase change random access memory (PRAM for short), or a magnetoresistive random access memory (MRAM for short), or may include a nonvolatile memory, such as at least one magnetic storage device, an electrically erasable programmable read-only memory (EEPROM for short), or a flash memory, for example, NOR flash memory or NAND flash memory. The nonvolatile memory stores an operating system and an application program that are executed by the processor. The processor loads a running program and data from the nonvolatile memory to a memory, and stores digital content into a large scale storage apparatus. The operating system is used for control and management of routine system tasks, such as memory management, storage device control, and power management, and various components and/or drivers that facilitate communication between various types of software and hardware. In an implementation of the present invention, the operating system may be an Android system of Google Inc., an iOS system developed by Apple Inc., or a Windows operating system developed by Microsoft Corporation, or may be a built-in operating system such as Vxworks.

In an embodiment, the processor 1501 is configured to select a radio resource used for a proximity-based service from a candidate resource. The communications module 1503 is configured to send report information to a first service server. The report information is used for reporting that the terminal is to perform the proximity-based service by using the radio resource, and is used by a service server of a network to which the radio resource belongs to manage the proximity-based service of the terminal. The first service server is a service server in a home network of the terminal. The report information carries a network identifier of the network to which the radio resource belongs.

Optionally, the communications module 1503 is further configured to receive authorization information sent by the first service server. The authorization information is network information used for indicating that the terminal is allowed to perform the proximity-based service. The processor 1501 is further configured to select the radio resource from the candidate resource according to the authorization information.

Optionally, the processor 1501 is further configured to select the candidate resource as the radio resource when network information corresponding to the candidate resource is the same as the network information carried in the authorization information.

Optionally, the communications module 1503 is further configured to receive a response message sent by the first service server. The response message is used for indicating whether the terminal can perform the proximity-based service by using the radio resource.

Optionally, the processor 1501 is further configured to perform the proximity-based service by using the radio resource. When it is determined, according to the response message, that the proximity-based service can be performed by using the radio resource, the terminal performs the proximity-based service by using the radio resource.

Figure 16:
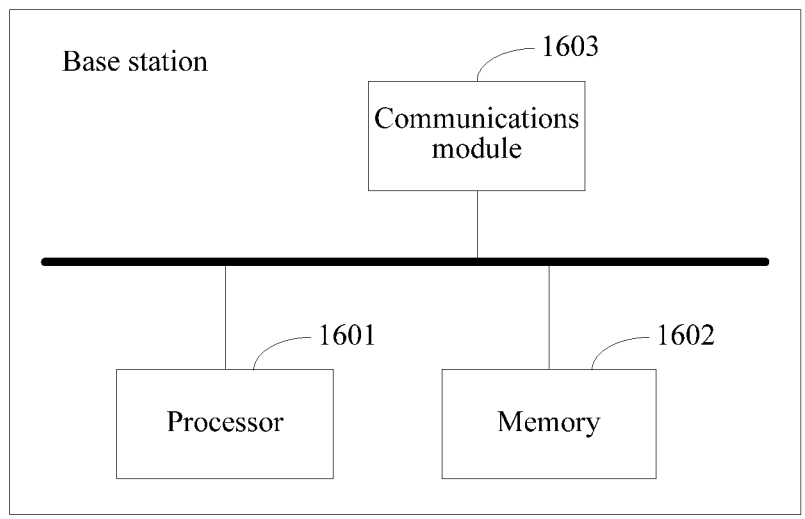
FIG. 16 is a schematic structural diagram of a base station according to an embodiment of the present invention.

Referring to FIG. 16, FIG. 16 is a schematic structural diagram of a base station according to an embodiment of the present invention. The server may be configured to perform the method in the embodiment corresponding to any one of FIG. 1 to FIG. 8.

As shown in FIG. 16, the base station may include a processor 1601, a memory 1602, and a communications module 1603. For connection relationships between and functions of the processor 1601, the memory 1602, and the communications module 1603, refer to the foregoing embodiment. Details are not described herein again.

The base station may is the first base station or the second base station in the foregoing embodiment.

When the base station is the second base station, in an embodiment, the processor 1601 is configured to invoke a radio resource for a first base station. The radio resource is used by a terminal served by the first base station, to perform a proximity-based service. The radio resource and the second base station belong to a second network, the first base station belongs to a first network, and the second network is different from the first network. The communications module 1603 is configured to send second notification information to the second service server. The second notification information is used for reporting that the second base station has invoked the radio resource for the first base station. The second service server belongs to the second network. The second notification information may carry a network identifier of the first network. The second notification information further carries invocation information of the radio resource. The invocation information may include at least one type of the following information: a frequency of the radio resource, bandwidth of the radio resource, or invocation duration of the radio resource.

Optionally, the processor 1601 is further configured to invoke, for the first base station, a candidate resource available for the proximity-based service. The candidate resource includes the radio resource.

When the base station is the first base station, in another embodiment, the processor 1601 is configured to: invoke a radio resource used for a proximity-based service from a second base station, where the second base station belongs to the second network, the first base station belongs to a first network, and the second network is different from the first network; and allocate the radio resource to a terminal served by the first base station, where the radio resource is used by the terminal to perform the proximity-based service by using the radio resource.

Optionally, the communications module 1603 is further configured to send third notification information to a first service server. The third notification information is used for reporting that the first base station has invoked the radio resource from the second network. The first service server belongs to the first network. The third notification information may carry a network identifier of the second network. The third notification information may carry invocation information of the radio resource. The invocation information may include at least one type of the following information: a frequency of the radio resource, bandwidth of the radio resource, or invocation duration of the radio resource.

Optionally, the processor 1601 is further configured to select, through negotiation with the second base station, the radio resource from a candidate resource that is available for the proximity-based service and that is of the second base station.

Figure 17:
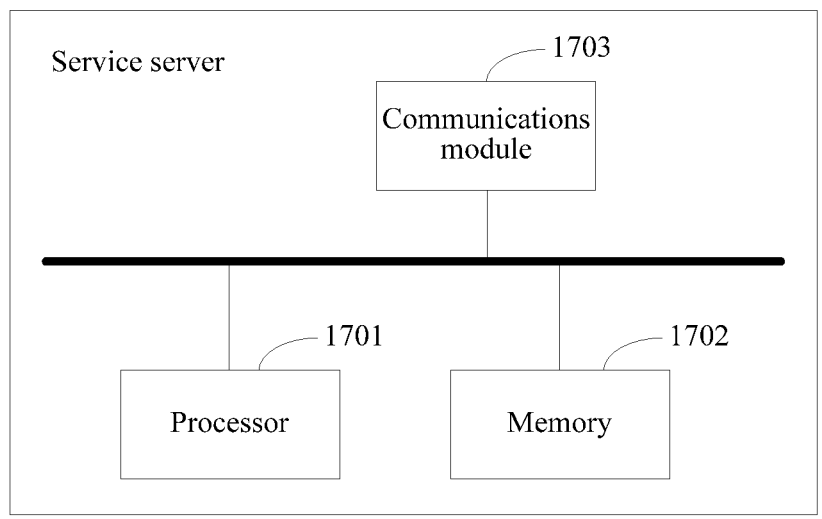
FIG. 17 is a schematic structural diagram of a service server according to an embodiment of the present invention.

Referring to FIG. 17, FIG. 17 is a schematic structural diagram of a service server according to an embodiment of the present invention. The server may be configured to perform the method in the embodiment corresponding to any one of FIG. 1 to FIG. 8.

As shown in FIG. 17, the service server may include a processor 1701, a memory 1702, and a communications module 1703. For connection relationships between and functions of the processor 1701, the memory 1702, and the communications module 1703, refer to the foregoing embodiment. Details are not described herein again.

The service server may be the first service server or the second service server in the foregoing embodiment.

When the service server is the first service server, in an embodiment, the communications module 1703 is configured to receive report information sent by a terminal. The report information is used for reporting that the terminal is to perform a proximity-based service by using a radio resource. The radio resource is selected by the terminal from a candidate resource. The processor 1701 is configured to learn, according to the report information, of the radio resource used by the terminal to perform the proximity-based service.

Optionally, the processor 1701 is further configured to: when the report information includes a network identifier, detect whether the terminal can perform the proximity-based service by using a radio resource of a network corresponding to the network identifier.

Optionally, the communications module 1703 is further configured to: when the radio resource does not belong to a network to which the first network device belongs, send notification information to a second service server. The notification information is used for reporting that the terminal is to perform the proximity-based service by using the radio resource. The second service server belongs to the network corresponding to the network identifier.

When the service server is the first service server, in another embodiment, the communications module 1703 is configured to receive third notification information sent by a first base station, where the third notification information is used for reporting that the first base station has invoked a radio resource from a second network, so that a terminal that accesses the first base station performs a proximity-based service by using the radio resource, the first service server and the first base station belong to the first network, the radio resource belongs to the second network, and the second network is different from the first network; and send fourth notification information to a second service server, where the fourth notification information is used for reporting that the target network resource has been invoked for the first base station, and the first service server belongs to the first network.

Optionally, the processor 1701 is further configured to: when the third notification information carries a network identifier, determine the second service server according to the network identifier. The communications module 1703 is further configured to send the first notification information to the second service server after the second service server is determined.

When the service server is the second service server, in another embodiment, the communications module 1703 is configured to: receive second notification information sent by a second base station, where the second notification information is used for reporting that the second base station invokes a radio resource for a first base station, so that a terminal that accesses the first base station performs a proximity-based service by using the radio resource, the second base station and the second service server belong to the second network, the first base station and the first service server belong to a first network, and the second network is different from the first network; and send first notification information to the first service server, where the first notification information is used for reporting that the target network resource has been invoked for the first base station.

Optionally, the processor 1701 is further configured to: when the second notification information carries a network identifier of the first network, determine the first service server according to the network identifier. The communications module 1703 is further configured to: after the first service server is determined, send the first notification information to the first service server.

In a specific implementation, an embodiment of the present invention further provides a computer storage medium. The computer storage medium may store a program, and when the program is executed, some or all of the steps of the embodiments of the radio resource determining method provided in the present invention may be performed. The storage medium may be a magnetic disk, an optical disc, a read-only memory (ROM), a random access memory (RAM), or the like.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The computer software product may be stored in a storage medium, such as a ROM/ RAM, a hard disk, or an optical disc, and includes several instructions for instructing a computer device (which may be a personal computer, a server, a network device, or the like) to perform the methods described in the embodiments or some parts of the embodiments of the present invention.

The embodiments in this specification are all described in a progressive manner, for same or similar parts in the embodiments, refer to these embodiments, and each embodiment focuses on a difference from other embodiments. Especially, embodiments of the apparatus, the server, and the system are basically similar to the method embodiment, and therefore are described briefly; for related parts, refer to partial descriptions in the method embodiment.

The foregoing descriptions are implementations of the present invention, but are not intended to limit the protection scope of the present invention. Any modification, equivalent replacement, and improvement made without departing from the principle of the present invention shall fall within the protection scope of the present invention.

What is claimed is:

1. A method, comprising:
   selecting, by a terminal, a radio resource from candidate resources for performing a proximity-based service using the radio resource, the candidate resources comprising a plurality of resources that are available for use in proximity-based communications and that belong to different networks, and the radio resource that is selected belonging to a first network of the different networks;
   reporting, by the terminal after selecting the radio resource from the candidate resources for performing the proximity-based service, in report information, to a first service server in a home network of the terminal, information of the radio resource selected by the terminal for the terminal to perform the proximity-based service and information of the first network;
   receiving, by the terminal from the first service server, in response to reporting the information of the radio resource and the information of the first network, a response message indicating whether the radio resource selected by the terminal is allowed for use by the terminal to perform the proximity-based service; and
   performing, by the terminal, the proximity-based service when the response message indicates that the radio resource selected is allowed for use by the terminal to perform the proximity-based service.

2. The method according to claim 1, wherein the selecting comprises:
   receiving, by the terminal, authorization information sent by the first service server, wherein the authorization information comprises network information of the first network to indicate that the terminal is allowed to perform the proximity-based service using a resource belonging to the first network; and
   selecting, by the terminal, the radio resource from the candidate resources according to the authorization information.

3. The method according to claim 2, wherein the selecting, by the terminal, the radio resource from the candidate resources according to the authorization information comprises:
   selecting, by the terminal, a candidate resource of the candidate resources as the radio resource when the candidate resource belongs to a network whose network information is the same as the network information carried in the authorization information.

4. The method according to claim 1, wherein
the report information includes a network identifier of the first network to which the radio resource belongs.

5. The method according to claim 1, wherein the first network is different than the home network of the terminal.

6. The method according to claim 1, wherein the method further comprises:
selecting, by the terminal, another radio resource from the candidate resources when the response message indicates that the radio resource is not allowed for use by the terminal to perform the proximity-based service.

7. The method of claim 1, wherein the radio resource is a frequency resource, and the first network is the home network of the terminal or the first network is different than the home network of the terminal, and the report information comprises a network identifier indicating the first network having the radio resource selected by the terminal.

8. A method, comprising:
receiving, by a first service server from a terminal, report information reporting a radio resource selected by the terminal for the terminal to perform a proximity-based service by using the radio resource, the first service server in a home network of the terminal, and the report information comprising information of a first network to which the radio resource belongs, wherein the report information comprises a network identifier of the first network;
learning, by the first service server according to the report information, of the radio resource used by the terminal to perform the proximity-based service;
sending, by the first service server to the terminal in response to receiving the report information, a response message to indicate whether the radio resource selected by the terminal is allowed for use by the terminal to perform the the proximity-based service; and
sending, by the first service server when the first network is different than the home network of the terminal, notification information to a second service server, wherein the notification information is to report that the terminal is to perform the proximity-based service by using the radio resource, and the second service server belongs to the first network to which the radio resource belongs.

9. The method according to claim 8, further comprising:
before the receiving, sending, by the first service server to the terminal, authorization information, wherein the authorization information comprises network information of the first network to indicate that the terminal is allowed to perform the proximity-based service using a resource of the first network.

10. An apparatus, comprising:
a processor, configured to select a radio resource from candidate resources for performing a proximity-based service using the radio resource, the candidate resources comprising a plurality of resources that are available for use in proximity-based communications and that belong to different networks, and the radio resource that is selected belonging to a first network of the different networks; and
a communications module, in communication with the processor and configured to report, after selecting, by the processor, the radio resource from the candidate resources for performing the proximity-based service, using report information, to a first service server in a home network of the apparatus, information of the radio resource selected by the apparatus for the apparatus to perform the proximity-based service and information of the first network, and to receive, from the first service server in response to reporting the information of the radio resource and the information of the first network, a response message indicating whether the radio resource selected is allowed for use by the apparatus to perform the proximity-based service; and
wherein the processor is further configured to perform the proximity-based service when the response message indicates that the radio resource selected is allowed for use by the apparatus to perform the proximity-based service.

11. The apparatus according to claim 10, wherein
the communications module is further configured to receive authorization information sent by the first service server, wherein the authorization information comprises network information of the first network to indicate that the apparatus is allowed to perform the proximity-based service using a resource of the first network; and
the processor is configured to select the radio resource from the candidate resources according to the authorization information.

12. The apparatus according to claim 10, wherein
the processor is configured to select a candidate resource from the candidate resources as the radio resource when the candidate resource belongs to a network whose network information is the same as the network information carried in the authorization information.

13. The apparatus according to claim 10, wherein the report information includes a network identifier of the first network to which the radio resource belongs.

14. The apparatus according to claim 10, wherein the first network is different than the home network of the apparatus.

15. The apparatus according to claim 10, wherein
the processor is further configured to select another radio resource from the candidate resources when the response message indicates that the radio resource is not allowed for use by the apparatus to perform the proximity-based service.

16. A first service server, comprising:
a communications module, configured to:
receive report information sent by a terminal, wherein the report information reports a radio resource selected by the terminal for the terminal to perform a proximity-based service by using the radio resource, and the radio resource is selected by the terminal from candidate resources available for proximity-based communications, the report information comprising information of a first network to which the radio resource belongs, and the first service server in a home network of the terminal; and
send, to the terminal in response to receiving the report information, a response message to indicate whether the radio resource selected by the terminal is allowed for use by the terminal to perform the proximity-based service; and
a processor, in communication with the communications module and configured to learn, according to the report information, of the radio resource used by the terminal to perform the proximity-based service.

17. The first service server according to claim 16, wherein the communications module is further configured to send authorization information to the terminal, wherein the authorization information comprises network information of the first network to indicate that the terminal is allowed to perform the proximity-based service using a resource of the first network.

18. The first service server according to claim 16, wherein the communication module is further configured to:
sending, when the first network is different than the home network of the terminal, notification information to a second service server, wherein the notification information is to report that the terminal is to perform the proximity-based service by using the radio resource, and the second service server belongs to the first network to which the radio resource belongs.

19. The first service server according to claim 16, wherein the report information comprises a network identifier of the first network to which the radio resource belongs.

20. A system comprising:
a first service server of a first network, configured to:
receiving report information reporting a radio resource selected by a terminal for the terminal to perform a proximity-based service by using the radio resource, the first network being a home network of the terminal, and the report information comprising information of a second network to which the radio resource belongs, wherein the report information comprises a network identifier of the second network;
learning, according to the report information, of the radio resource used by the terminal to perform the proximity-based service;
sending, to the terminal in response to receiving the report information, a response message to indicate whether the radio resource selected by the terminal is allowed for use by the terminal to perform the proximity-based service; and
sending, when the second network is different than the home network of the terminal, notification information to a second service server, wherein the notification information is to report that the terminal is to perform the proximity-based service by using the radio resource, and the second service server belongs to the second network to which the radio resource belongs; and
the second service server of the second network, configured to receive the notification information from the first service server.

21. The system according to claim 20, wherein the first service server is further configured to:
send, to the terminal before receiving the report information, authorization information, wherein the authorization information comprises network information of the second network to indicate that the terminal is allowed to perform the proximity-based service using a resource of the second network.

* * * * *

UNITED STATES PATENT AND TRADEMARK OFFICE
CERTIFICATE OF CORRECTION

PATENT NO. : 10,735,986 B2
APPLICATION NO. : 15/971042
DATED : August 4, 2020
INVENTOR(S) : Runze Zhou et al.

Page 1 of 1

It is certified that error appears in the above-identified patent and that said Letters Patent is hereby corrected as shown below:

In the Claims

In Column 27, Line 35, Claim 8, delete "the the" and insert --the--.

Signed and Sealed this
Twenty-seventh Day of October, 2020

Andrei Iancu
*Director of the United States Patent and Trademark Office*